United States Patent [19]
Mosher et al.

[11] 3,930,045
[45] Dec. 30, 1975

[54] IN SITU PRODUCTION OF MEAT LIKE FLAVOR IN EXTRUDED POROUS FOOD PRODUCT

[75] Inventors: Arthur Joseph Mosher, Paris Township, Union County, Ohio; Donald Eugene Yingst, Lausanne, Switzerland

[73] Assignee: Societe d'Assistance Technique pour Produits Nestlé S.A., Lausanne, Switzerland

[22] Filed: Nov. 20, 1973

[21] Appl. No.: 417,535

[52] U.S. Cl. .................................................. 426/533
[51] Int. Cl.² .......................................... A23L 1/231
[58] Field of Search ............ 426/65, 141, 213, 808, 426/364, 380, 533

[56] References Cited
UNITED STATES PATENTS

| | | | |
|---|---|---|---|
| 2,934,437 | 4/1960 | Morton et al. | 426/65 |
| 3,394,015 | 7/1968 | Giacino | 426/65 |
| 3,480,442 | 11/1969 | Atkinson | 426/808 X |

*Primary Examiner*—James R. Hoffman
*Attorney, Agent, or Firm*—Watson Leavenworth Kelton & Taggart

[57] ABSTRACT

A process for preparing an expanded porous food product having a meat-like flavor comprising mixing (A) Finely divided food material, (B) reducing sugar, (C) sulfur-containing substance and (D) water, and extruding the resultant admixture under elevated conditions of temperature and pressure. Food products having desirable characteristics of texture, flavor, and density may be obtained wherein the aforementioned components (B) and (C) are provided within a ratio sufficient to maintain a continuous, steady extrusion process which avoids differential pressure build-up and resultant surging of the extrudate product.

17 Claims, No Drawings

IN SITU PRODUCTION OF MEAT LIKE FLAVOR IN EXTRUDED POROUS FOOD PRODUCT

The present invention is concerned with the preparation of a porous expanded food product having a meat-like taste.

It is an object of this invention to provide edible compositions having a meat-like flavor and aroma and to do so by simple and efficient process means.

More particularly, the present invention comprises a process whereby certain desirable flavor components for porous, expanded food products — viz. reducing sugars and sulfur-containing substances — may be extruded as part of a feed comprising finely divided food material and water without detrimental effect to the extrusion process or the resultant product.

It has heretofore been proposed to employ various flavorants in porous expanded food products produced through the extrusion of finely divided food materials and water under elevated conditions of temperature and pressure. This incorporation of flavorants has most frequently been effected through impregnation of the expanded porous products with aqueous solutions of the flavorings. However, impregnation generally needs to be followed by drying of the flavor product in order to restore the crisp character of the product or to reduce its moisture content so that the product may be stored for relatively long periods of time without appreciable change in its structure and taste.

The expression "finely divided food material" identified herein as compound (A) is intended to encompass a material in the form of particles of greater or lesser fineness such as a plant flour or semolina rich in carbohydrates, for example, maize, starch, rice flour, or semolina, or a material rich in protein, for example, soya bean flour or a product containing proteins of animal or microbial origin.

More preferably, the present class of food material comprises protein-containing materials such as soy flour or peanut flour. Any such food material, most preferably containing at least about 30% by dry weight of protein, however, is encompassed by this terminology. Additionally, such protein-containing materials desirably have a low fat content, for example not exceeding about 2.5%, or most desirably less than about 0.5%, by dry weight of the food material.

The reducing sugar — identified herein as compound (B) — may be any sugar within the normal meaning of the term, including mono and polysaccharides but is most desirably a pentose or hexose. Suitable examples comprise ribose, xylose, arabinose, lactose, and glucose. Any reducing sugar which is susceptible to undergoing the well known "browning reaction" may be employed within the scope of the present invention. Additionally, mixtures of these sugars are also useful.

The compositions falling within the meaning of the term, "sulfur-containing substance", — identified herein as compound (C) — are myriad. These compositions may be further characterized, however, by the necessity that such sulfur be in, or be readily transformed under the present extrusion conditions into, a reactive sulfur radical. Exemplary of such radicals are the sulfide and sulfhydryl groups. Preferably, the substances are amino acids or are employed in conjunction with amino acids.

All sulfur-containing amino acids or corresponding salts, for example, are useful within the scope of the present invention. Cysteine, however, is the preferred sulfur-containing amino acid, although cystine has also proven particularly useful.

As an alternative, an amino acid not containing sulfur, such as alanine, may be used together with a substance containing a reactive sulfur, for example, hydrogen sulfide or sodium sulfide. These components appear to react prior to, or during, the present extrusion process so as to provide a product consonant in activity to the above indicated sulfur-containing amino acids. It is not intended, however, that the scope of the present invention be limited by the suggested reaction between an amino acid and a sulfur-containing substance. It may well be that these two components merely act in congress to provide essentially the same effect as the preferred sulfur-containing amino acids. Accordingly the recitation of a sulfur-containing substance is not intended to be limited by the proposed theory that a reaction actually takes place. Rather, such a term is intended to encompass both possible reaction products thereof as well as admixtures which provide the function discussed herein below.

Finally, sulfur-containing substances which are not amino acids or used in conjunction with amino acids are useful. Thus, for example, mercaptosuccinic acid or sodium hydrosulfide have proved efficacious within the scope of the present invention.

The final component necessary for the extrusion feed is water. Ordinarily, the amount of water contained in the extrusion feed should be between about 18 and 45% by weight of the admixture, more preferably between about 22 and 30%. The actual amount of water present in the admixture is generally selected within the foregoing parameters having regard to the water adsorption capacity of the food material, so that after adsorption by the food material, the resultant mixture has a moistened to dough-like consistency without a liquid phase. The only critical aspect of water content, however, is the requirement that there be sufficient water so as — under the elevated conditions of temperature and pressure produced during extrusion — to develop a sufficient amount of steam for the production of an expanded porous structure in the extrudate product.

Inasmuch as the identification of the particular extrusion components and the particular flavors derived therefrom largely constitutes the subject matter of a different invention, further discussion thereof is omitted. Reference is made, however, to United States application Ser. No. 417,503, filed Nov. 20, 1973 concurrently herewith by Paul Van DeRovaart and Jean-Jacques Wuhrmann entitled "Food Product And Process". Further particulars as to the nature of various additional food materials, sugars, amino acids, and additional flavor enhancers which may be employed within the scope of the present invention are more completely described therein.

In the production of expanded porous food products within the scope of the present invention, a dough comprising at least the foregoing components of a food material, reducing sugar, sulfur-containing substance and water is thoroughly mixed and then subjected to extrusion under appropriate conditions of temperature and pressure.

The extrusion step may be performed with any number of commercially available forms of apparatus. Particularly useful such forms, for example, are extruders produced by Wenger and Troester. Most preferably, of course, such extruders should permit flexibility of conditions such as temperature, pressure, and feed rate so as to permit adaptation to processing variations such as the texture, composition and/or consistency of the food materials intended to be expanded.

Suitable extruders should preferably be capable of processing the extrusion feed within a very short time, for example between from about 10 to about 60 seconds. During such time — which is measured from introduction of the feed to heightened temperature and pressure conditions to exit from the extrusion die — the critical factors which transform the dough into a coherent, porous expanded food product are experienced.

The foregoing conditions are generally known in the art and are more fully described in the above identified application of Rovaart et al. They should, however, at least include pressures of the order of from about 5 to about 100 atmospheres and a temperature between about 80° and 200°C. More preferably, these conditions should range from about 10 to about 40 atmospheres and 100° to 150°C over an extrusion time of the order of 10 to 30 seconds. These conditions are interdependent, however, and may be modified accordingly.

The product exiting from the extruder comprises an expanded porous food product, useful within its own right. Preferably, however, this product is subjected to additional drying, for example for a period of from about 5 to 30 minutes at an air temperature of from about 45° to 170°C so as to stabilize the food against deterioration.

When the abovementioned further drying of expanded porous food extrudates is performed, a general moisture content of from about 2 to about 10% is normally achieved. Accordingly, utilization of the food product then usually requires rehydration in order to transform it from a crisp, brittle form to a texture more analogous to that of meat. Such rehydration may very easily be accomplished, simply through immersion of the porous dried food in an aqueous medium.

The essence of the present invention resides in the fact that, despite the foregoing discovery that it is highly desirable to incorporate a reducing sugar and a sulfur-containing substance into an extrusion feed for the production of expanded porous food products, such incorporation may detrimentally affect the physical form of the resultant food product.

More particularly, it has been discovered that most extrusions performed on feeds of moistened finely divided food material which additionally include a reducing sugar and/or a sulfur-containing substance produce extrudates with little or no uniformity of expansion in the composition.

Thus, whereas the extrusion of finely divided food materials and water has long been known to be an effective means for producing uniform, expanded porous products having desirable textures, where such simple feed has been modified to incorporate reducing sugars and/or sulfur-containing substances, the resulting extrudate has been found to exhibit widely variant and often undesirable density, flavor and rehydration characteristics so as to be relatively undesirable as a food product.

Not only do the present flavor additives (B) and (C) often adversely affect the present food products, but additionally the reducing sugar and sulfur-containing substance detrimentally affect the extrusion step itself. Thus, incidental to the presence of these additives in the feed, the normally uniform, steady process of extrusion is subjected to severe and erratic interruptions. These interruptions can be characterized as a form of "surging" of the extrusion product, and appear to be caused by intermittent pressure build-ups within the extruder itself. These pressure build-ups are spontaneously reduced with the result that extrusion product is blown from the extruder and thus the material is subjected not only to uncontrolled pressure and temperature variation, but additionally to variation in residence time within the extruder.

The effect of surging on the extrudate itself is also pronounced. Apparently incident to the conditions to which it is exposed during such sporadic extrusion, the extrudate exhibits wide variation in physical and textural form. Thus, for example, the product issuing during surging extrusion will display variation in color from light to dark, as well as differences — of a factor of from about 0.2 to about 4 — in the physical dimensions of the extrudate after issuing from the same die pores. Further, particles having each of the foregoing characteristics within the entire spectrum of possible forms are normally produced incident to surging. Consequently, it becomes impossible even to separate reasonable —if any— yields of the desired product from the resultant variant forms.

Finally, even where subsequent drying and rehydration steps are performed in extrudate compositions which have been produced during surging, their undesirable characteristics of texture, density, size, flavor and rehydratability are retained.

The essence of the present invention resides in the discovery that, despite the identification of low threshold, extrusion inhibitory concentrations for each of the present flavorants (B) and (C), a means for providing concentrations of such ingredients — sufficient to provide desired flavor enhancement — has been found. Moreover, such means permits the practice of extruding compositions containing combinations of the present additives in concentrations which are far in excess of their individual threshold limits.

This discovery is based on an unexpected interaction which has been evidenced by the combination of reducing sugars and sulfur-containing substances, where such additives are present in concentrations having specific ratios. Once the existence of essential ratios for a number of specific combinations was discovered, it was realized that a general relationship existed between reducing sugars and sulfurcontaining substances. Accordingly, operable ratios for additional combinations have been found. These additional determinations are, of course, hereby rendered within the ordinary skill in the art, as they merely require routine experimentation with varying percentage weights of the two desired constituents, until continuous extrusion — devoid of surging — is obtained.

Nor do these additional determinations need be entirely empirical. Various successful ratios for specific reducing sugars to specific sulfur-containing substances are set forth in the table below. While serving as appropriate examples, the entries in this table are additionally presented as further guidance in the formulation of additional such combinations within the scope of this invention; such additional combinations being to some extent theoretically determinable on the basis of the relative activities of reducing sugars and/or sulfur-containing substances sought to be employed.

TABLE I

Non-Surge Ratios
Based on Total (B) + (C) Weights Of About 1 To 2% Of (A)

| Sugar/Sulfur Substance | Ranges of Ratios | |
|---|---|---|
| | Preferred | Operable |
| Xylose/Cysteine | 0.8:1 to 4:1 | 0.5:1 to 7:1 |
| Glucose/Cysteine | 2:1 to 15:1 | 1:1 to 25:1 |
| Lactose/Cysteine | 6:1 to 20:1 | 4:1 to 30:1 |
| Xylose/Mercaptosuccinic Acid | 0.8:1 to 2.5:1 | 0.4:1 to 4:1 |
| Xylose/NaSH | 0.8:1 to 3:1 | 0.4:1 to 5:1 |
| Xylose/Cysteine | 0.6:1 to 3:1 | 0.4:1 to 5:1 |

For example, a comparison of the preferred xylose/cysteine ratios with those for glucose/cysteine conform with the relative activities of these two reducing sugars. The respective "surge-free" ratios reflect such difference in activity inasmuch as xylose exhibits a lower surge-free ratio than does glucose. In a similar manner, it is possible herein —based on the relative activities of additional sugars to those setforth herein — and of additional sulfur-containing substances to those setforth herein — to enjoy a degree of predictability as to the desired ratios. Accordingly, those wishing to practice additional specific combinations within the scope of the present invention or wishing to practice the present invention utilizing combinations of reducing sugars and/or combinations of sulfur-containing substances may do so easily.

The foregoing discussion of essential ratios is not intended to suggest that unlimited amounts of otherwise surge-producing additives may be successfully extruded. As may be observed from the examples which follow, these ratios appear merely to raise the aforementioned low threshold of extrusion-inhibition to tolerable concentrations. Thus, for example, concentrations of flavorants of up to about 5% by weight of finely divided food material may be achieved, while 0.5% is the usual lower limit.

In many instances the desired total concentration of flavorant (B) and (C) will not reach the maximum extrudable amounts — although they would be higher than the threshold concentrations of individual additives. Thus, for example, a total concentration of components (B) and (C) might desirably reside in the range of from about 0.5 to 3% by weight of component (A). Where an intermediate concentration is thus selected, some alteration from the recited ratios may prove necessary as the surge-free ratio parameters for the present flavorants have exhibited a limited total concentration dependency.

This dependency —or drift— of the surge-free ratio parameters should not, however, produce undue difficulty in the practice of the present invention. The variations in total concentration of the present flavorants would not be expected to be great and thus the particular limits of surge-free ratios could readily be determined.

EXAMPLE I 91 kilograms of defatted soy flour (Baker's Nutrisoy produced by Archer-Daniels-Midland) and 289 grams cysteine hydrochloride monohydrate were dry-blended in the feed bin of a Wenger extruder (Model X25CF). The blend was then passed to an extruder load chamber of high speed mixing capacity, which chamber was provided with side ports through which water and/or aqueous flavoring solutions could be added to the blend.

The dry blend was fed into the load chamber at a rate of 2.63 kilograms/minute while the total amount of water and/or solution was added at a total constant rate of 650 cc/minute. By varying the rates of addition of pure water and of glucose solution into the load chamber, it was possible to observe the effect which different ratios of glucose to cysteine produced in the extrusion process and upon the extrudate product. The data thus derived by varying the glucose/cysteine ratio are reported in the table below.

TABLE II

| Glucose (Wt.% of Total Solids) | Ratio (Glucose/cysteine) | Extrusion Process | Product Characteristics |
|---|---|---|---|
| 0% | 0 | Surging | Puffing, stringy, light tan |
| 0.64% | 2.9:1 | Uniform | Minor puffing, tan |
| 1.28% | 5.8:1 | Uniform | Controlled expansion, brown |
| 1.92% | 8.7:1 | Uniform | Controlled expansion, brown |
| 2.55% | 11.6:1 | Mild surging | Partial fiber, dark brown |
| 3.19% | 14.5:1 | Surging | No fiber, dark brown |

EXAMPLE II

The process of Example I was repeated with the exception that the cysteine hydrochloride was deleted from the dry blend fed to the load chamber and only water was injected into the load chamber. Accordingly, the composition extruded consisted solely of appropriate amounts of soy flour and water. The extrusion ran smoothly, without any surging, and the resultant extrudate was well defined and textured while exhibiting a light brown color. Accordingly, this example shows that in the absence of reducing sugar and sulfur-containing substance, proper extrusion is obtained.

EXAMPLE III

The process of Example II was repeated with the addition of a number of secondary additives to the dry blend. These additives were blended on the following basis:

| | |
|---|---|
| NaCl | 954 grams |
| CaCl₂ Dihydrate | 1,262 grams |
| Lactic Acid (88%) | 1,020 grams |
| Ribotide | 290 grams |
| Monosodium Glutamate | 480 grams |
| Beta-alanine | 118 grams |
| Histidine Hydrochloride Monohydrate — 278 grams | |

The extrusion of the foregoing composition was performed smoothly without surging. The resultant extrudate exhibited well defined and textured composition and was only a slightly darker brown than the extrudate of Example II.

Accordingly, this example evidences the minimal effect which secondary additives — i.e., additives which are not reducing sugars or sulfur-containing substances — have on the extrusion of moistened finely divided food material.

EXAMPLE IV 630 grams of glucose was dry blended with the 91 kilograms of defatted soy flour, and cysteine hydrochloride was injected as an aqueous solution into the feed chamber of the Wenger extruder of Example I. The blend and aqueous solutions were mixed at rates of 2.0 kilograms/minute and 600 cc/ minute, respectively, in the feed chamber. By varying the relative feed of pure water and cysteine-containing water into the chamber, again at a total constant rate of about 600 cc/minute, the following data was compiled respecting the effect of varying ratios of glucose/cysteine on the present extrusion.

TABLE III

| Cysteine (Wt.% of Total Solids) | Ratio (Glucose/ cysteine) | Extrusion Process | Product Characteristics |
|---|---|---|---|
| 0 | — | Surging | No fiber, burned |
| .039 | 21.5:1 | Mild Surging | Partial fiber, brown |
| .056 | 15:1 | Mild Surging | Partial fiber, light brown |
| .113 | 7.4:1 | Uniform | Controlled expansion, tan |
| .225 | 3.7:1 | Uniform | Mild puffing, tan |
| .28 | 3.0:1 | Surging | Puffing, light tan |

EXAMPLE V

This example is performed in accordance with the process described in Example III with the exception that an aqueous feed containing both xylose and cysteine in a ratio of 3.0:1 was administered to the feed chamber. Accordingly, the composition undergoing extrusion was provided with varying total concentrations of xylose-cysteine in set ratio. Additionally contained are the various secondary additives recited in Example III in the proportions disclosed therein. Data obtained pursuant to extrusion as reflected in the table below:

TABLE IV

| Xylose (Wt.% of Total Solids) | Ratio (Xylose/ cysteine) | Extrusion Process | Product Characteristics |
|---|---|---|---|
| 0.52 | 3:1 | Uniform | Controlled expansion, tan |
| 1.04 | 3:1 | Uniform | Controlled expansion, tan |
| 1.55 | 3:1 | Uniform | Partial fiber, light brown |
| 2.07 | 3:1 | Surging | Partial fiber, brown |
| 2.59 | 3:1 | Extreme surging | No fiber, burned |

EXAMPLE VI

A dry blend of 45.5 kilograms of defatted soy flour, 45.5 kilograms of defatted peanut flour (Gold Nut produced by Gold Kist) and 396 grams of cysteine hydrochloride monohydrate was fed at a rate of 2.36 kilograms/minute into the feed chamber of the extruder of Example I. Streams of water and/or aqueous solution of xylose was injected into the chamber at a total rate of 650 cc/minute. Extrusion results were obtained as follows:

TABLE V

| Xylose (Wt.% of Total Solids) | Ratio (Xylose/ cysteine) | Extrusion Process | Product Characteristics |
|---|---|---|---|
| 0 | 0 | Surging | Puffing |
| 0.24 | 0.8:1 | Mild surging | Mild puffing |
| 0.48 | 1.6:1 | Uniform | Controlled expansion |
| 0.84 | 2.8:1 | Uniform | Controlled expansion |
| 0.96 | 3.2:1 | Uniform | Acceptable fiber |
| 1.20 | 4.0:1 | Mild surging | Partial fiber, burned |

Countless additional illustrations could be recited, but it is believed that, with the above illustrations and discussion of the criteria and critical factors involved, anyone having ordinary skill in this art could adapt the present novel method to various concentrations of reducing sugar, cysteine, finely divided food materials, and secondary flavor additives. Thus the desired surge-free extrusion process and resultant product are available merely through a few trial and error variations in the ratios and processing conditions set forth more fully above. Variations in these and related factors could easily be made within the scope of the present invention.

We claim:
1. In a process for preparing an expanded porous food product which comprises:
   A. forming a mixture of finely divided carbohydrate or protein food material with water and
   B. extruding said mixture under conditions of elevated temperature and pressure,
the improvement which comprises blending reducing sugar and sulfur-containing substance with said mixture, the sulfur of said substance being in, or being readily transformable under said extrusion conditions into, a reactive sulfur radical and wherein said sugar and substance are in an amount sufficient to impart meat-like flavour to said food product and are in a ratio which stabilizes the extrusion flow rate.

2. The process of claim 1, in which the sulfur-containing substance is selected from the group consisting of sulfur-containing amino acid and a mixture of amino acid and substance containing sulfur.

3. The process of claim 2, in which the sulfur-containing amino acid is cysteine or cystine.

4. The process of claim 2, in which the substance containing sulfur is hydrogen sulfide or sodium sulfide.

5. The process of claim 1, in which the sulfur-containing substance comprises a substance which contains, or will yield under extrusion conditions, compound having a radical selected from the group consisting of sulfide or sulfhydryl.

6. The process of claim 1, in which the total weight of reducing sugar and sulfur-containing substance is within the range of from 0.5 to 5% by weight of finely divided food material.

7. The process of claim 1, in which at least one of members selected from the group consisting of reducing sugar and sulfur-containing substance is present in the mixture in a concentration higher than the threshold extrusion-inhibition concentration for said individual member.

8. The process of claim 1, in which the reducing sugar is selected from the group consisting of ribose, xylose, arabinose, lactose and glucose.

9. The process of claim 1, in which the finely divided food material comprises at least about 30% protein by dry weight.

10. The process of claim 9, in which the food material comprises soy flour.

11. The process of claim 1, in which the extrudate is dried to a moisture content of from about 2 to 10% by total weight.

12. The product produced by the process of claim 11.

13. The product produced by the process of claim 1.

14. The process of claim 1, in which the mixture of step (A) exhibits a moistened to dough-like consistency without a liquid phase.

15. The process of claim 1, in which the conditions of elevated temperature and pressure of step (B) are from 80° to 200°C and from 5 to 100 atmospheres.

16.. The process of claim 15, in which the conditions of elevated temperature and pressure of step (B) are from 100° to 150°C and from 10 to 40 atmospheres and the mixture is subjected to such conditions for a period of from 10 to 30 seconds.

17. The process of claim 1, in which the sulfur-containing substance is mercaptosuccinic acid or sodium hydrosulfide.

* * * * *

UNITED STATES PATENT OFFICE
CERTIFICATE OF CORRECTION

PATENT NO. : 3,930,045
DATED : December 30, 1975
INVENTOR(S) : ARTHUR JOSEPH MOSHER, et al It is certified that error appears in the above-identified patent and that said Letters Patent are hereby corrected as shown below:

Col. 4, line 28, "in" should read --on--.

Col. 5, last line of Table 1, "Xylose/Cysteine" should read --Xylose/Cystine--.

Claim 1, lines 3 and 5, "A." should read --(A)-- and "B." should read --(B)--.

Signed and Sealed this twenty-second Day of June 1976

[SEAL]

Attest:

RUTH C. MASON
Attesting Officer

C. MARSHALL DANN
Commissioner of Patents and Trademarks